Patented Feb. 15, 1949

2,462,029

UNITED STATES PATENT OFFICE 2,462,029

ADHESIVE COMPOSITIONS

Lloyd M. Perry, Nashua, N. H., assignor to Nashua Gummed and Coated Paper Company, Nashua, N. H., a corporation of Massachusetts No Drawing. Application May 25, 1945,
Serial No. 595,890

7 Claims. (Cl. 260—29.1)

This invention relates to adhesive films and to articles, such as labels, adhesive tapes, etc., having an adhesive coating, and the object is to provide in such film or coating a novel physical or mechanical relationship of its components whereby it will have properties, particularly those made available by change in such relation at certain imposed temperatures, which will be advantageous in practical use.

A sketch of the subject matter at this point will facilitate understanding of what follows. This sketch, however, should not be considered as a full disclosure or as a discriminating definition. Briefly I may say that the purpose is to provide a solid potentially adhesive film, which may be a coating on an article serving as a carrier for the film or intended to be attached by the film to some other article, as, for example, a sealing tape, a label or the like, which film is substantially unalterable and non-tacky at the temperatures and atmospheric conditions encountered during storage or at the place of use ("room temperature") but which when activated by heat will become usefully adhesive and although thereafter cooled to a temperature substantially below such activation temperature will at such lower temperature remain tacky for a usefully prolonged period of time. A specific example, to which, however, the invention in its broader aspects is not limited, is one wherein the film after activation will remain usefully adhesive after cooling to ordinary room temperatures.

My invention will be well understood from the following description in which various illustrative examples are given and which outlines the principles of the invention in such manner that those skilled in the art may without experimentation of an inventive character apply those principles to the selection and compounding of other specific ingredients.

Before proceeding with the detailed description it may be helpful if we remind ourselves of certain fundamental considerations as set forth in this and the following paragraph. If we consider a thermoplastic material, which is viscid or potentially viscid, it will be apparent that we may recognize a change of properties dependent on temperature. Thus if the material is sufficiently chilled, it will "freeze" and become hard and brittle. As the temperature rises it becomes more pliable although still solid and at a certain temperature will begin to soften so that it will tack or stick to a surface with which it is brought in contact. This tackiness would be undesirable in handling or storing the material although not sufficiently developed to render it useful as an adhesive. This tacking temperature may be considered as a threshold above which lies a temperature range throughout which the material is usefully adhesive. As the temperature rises, the material will become more and more fluid, losing adhesive tack, and may be considered as finally a relatively thin fluid with substantially no adhesive power.

All these points or ranges have an importance in the adaptability of the material as a practical adhesive. Thus if the material is liquid at room temperatures or the ordinary temperatures of use, it is no adhesive at all. On the other hand, if it is hard and brittle at such temperatures, its usefulness is at most limited, particularly when applied to flexible material. A familiar illustration is the fact that a hard drying glue is unsatisfactory for gluing up the back of a book which is flexed constantly in use. If room temperatures lie in the adhesive range, we have a pressure-sensitive adhesive of which so-called "surgeon's plaster" is an example, which is adhesively tacky at normal temperatures and adheres firmly at body temperature. A well known draw-back to pressure-sensitive adhesives is that precautions must be taken to prevent their tacking or blocking to similarly coated surfaces or exterior objects. Thus if a tape of ordinary paper were coated with such an adhesive and rolled up, the turns would stick together. If a number of coated sheets were piled up for storage in direct contact, they would stick together or "block." Where the adhesive range lies above room temperature, we have a heat-activated adhesive. Thermoplastic adhesive compositions in the form of film coatings on carriers of paper or other material ready for adhesive use upon the application of heat are well known in the art. Unless we are to resort to protective coatings or interpose separating sheets, it is desirable that the film be non-tacky at room temperatures, so called, so that the product may be freely handled prior to use or left in contact with other surfaces. Thus if the film constitutes the adhesive layer on sheet material such as a tape or a label, it should be sufficiently non-tacky so that one ply will not adhere to another when wound in a roll or when sheets are stacked successively one on another. In thermoplastic compositions as hitherto known the temperature of incipient tackiness, which might cause objectionable premature sticking together, is considerably below the temperature at which usefully adhesive softening is obtained. In order to ensure non-tackiness at ordinary temperatures of storage and handling, it is necessary to employ compositions that require relatively high temperatures for adhesive joining even although in many instances a lower temperature would have been desirable. Clearly it would be advantageous if the temperature of incipient tackiness could be raised without unduly raising the temperature initially required for good initial joining and this may be realized in accordance with the principles of the present invention.

Furthermore, the thermoplastic compositions of the prior art have been limited in usefulness because the temperature initially required to render the composition adhesive had to be maintained throughout the period of adhesive joining. It was customary to make the adhesive juncture while the heated element was in firm contact with the back of the adhesively coated carrier element. Pressing with a heated flatiron is the homely example. Because there is a time lag in the heat permeation of the backing material, varying with its thickness and nature, such an application of heat has limited the speed of adhesive joining to a rate materially lower than that necessitated by manual or mechanical limitations only. Compositions illustrative of the present invention may be initially activated and rendered adhesive and will remain adhesive at temperatures which may have dropped significantly below the activation temperature. This makes possible and practical the application of heat prior to the operation of adhesive joining and this provides the opportunity for faster adhesive joining. Improved quality of the joint may be obtained since the risk of imperfect joints which in the prior art might occur as a result of a relatively slight temperature drop is greatly lessened. Furthermore, the possibility of applying heat prior to the adhesive joining permits the adhesive coated face of the material to be heated directly as by radiant heat. This renders possible the subsequent joining of thick sheets or objects of such shape that the joint is other than a plane surface and which it would be impractical to join under the in situ application of heat.

A specific application of the invention, as already suggested, brings embodiments thereof into the field of so-called pressure-sensitive adhesive compositions which are employed to adhesively join surfaces at normal room temperatures or lower. Coatings of the pressure-sensitive type as hitherto employed have entailed the obvious disadvantages inherent in their being sticky when they are initially made and when subsequently subjected to normal temperatures of storage and handling. By a proper choice of ingredients it is possible in accordance with the present invention to provide compositions which prior to adhesive activation will be non-tacky under normal conditions of storage and handling but which after such activation will remain adhesive at normal room temperatures or lower for a useful period of time. In other words, a non-tacky material is provided which is potentially pressure-sensitive and which may be transformed into pressure-sensitive material in preparation for use.

As will be inferred from what has been said, compositions illustrative of the invention, when considered as a whole, soften more readily after having once been activated than before and thus in a second state as compared with their initial state may be described as plasticized. In the initial state they have a latent self-plasticizing property which is developed by the first heating. In such composition we may distinguish as a primary constituent a potentially viscid ingredient of a resinous or polymeric nature (which may either be a single material having an identifying name as such, even although chemically complex, or a mixture of such materials) and as another primary constituent an ingredient consisting of one or more components of crystalline character which are present in the form of discrete particles dispersed in the composition as a whole. These two primary constituents coexist in the composition in mechanical mixture but physically and chemically are substantially separate from each other, retaining their physical individuality until activation by heat takes place. In general the composition takes the form of a normally solid potentially adhesive film non-tacky at room temperatures and which to the naked eye (megascopically) appears homogeneous but which on magnification will be seen to be in fact a heterogeneous mechanical mixture of a plurality of solid materials as just described. The plasticizing constituent is compatible with the potentially adhesive constituent in the sense that they are mutually soluble when in liquid condition. On activation by heat the physical separation of the primary constituents is destroyed, the two merge together and the normal tendency of the crystalline material to recrystallize on cooling is inhibited or delayed to yield for a useful period thereafter a plasticizing effect on the materials, which are now united physically as well as mechanically.

It follows from what has been said that if the plasticizing property is to be latent in the original composition with the crystalline components initially and up to the time of heat activation dispersed in solid discrete particle form substantially undissolved in or by the other components, then the formation of the film either by heating together of the components or by the employment of a common solvent, one or the other of which steps is utilized in preparing many adhesives in the prior art, is precluded. This will appear from the examples which I shall next give of two compositions formed from the same ingredients, one (Example A) being compounded in such a manner as to produce a composition illustrative of the invention while the other (Example B) is compounded in a manner common in the prior art and thus represents a counter-example which serves to make clear the principles of the invention and its contrast with the prior art practices and also emphasizes that the invention lies primarily in the form of the composition rather than in the exact identity of the component ingredients.

*Example A*

| | Parts |
|---|---|
| Indene resin (potentially adhesive ingredient) | 45 |
| Ethyl cellulose (20 c. p. s.) (potentially adhesive ingredient also here serving as a binder) | 10 |
| Diphenyl phthalate (plasticizer) | 45 |
| Ethyl alcohol | 158 |

Indene resin is a grade known as "Nevindene R–3" and is supplied by Neville Co. This resin is insoluble in alcohol.

Ethyl cellulose is alcohol soluble. This and the indene resin form the potentially adhesive components.

Diphenyl phthalate is a crystalline material relatively insoluble in alcohol and is here employed as the latent plasticizing component.

Ethyl alcohol may be a completely denatured grade.

Five parts of ethyl cellulose are dissolved in 142 parts of alcohol and the 45 parts of diphenyl phthalate and the 45 parts of indene resin (which has been previously dry ground) are added to this solution and ground for fifteen hours in a ball mill or until the diphenyl phthalate and the indene resin are in an adequately fine state of dispersion. It will be understood that the indene resin, although for convenience used in discrete particle form because it is insoluble in alcohol, is not intended as a crystalline or latent plasticizing component. It is a relatively low cost resinous material and is used as a potentially adhesive component.

The remaining 5 parts of ethyl cellulose are dissolved in the remaining 16 parts of alcohol and added to the above ground dispersion.

This makes a coatable composition which after being deposited as a film or layer and dried by evaporation of the alcohol at a relatively low temperature is opaque and consists of discrete particles of diphenyl phthalate and indene resin bound together by the ethyl cellulose. The temperature of incipient tackiness before heat activation is approximately 140° F. After activation and subsequent cooling the temperature of incipient tackiness is approximately 100° F. The adhesive temperature initially required is approximately 165° F. After activation and subsequent cooling the adhesive temperature is approximately 125° F.

By way of contrast we may now consider the same non-volatile components compounded in accordance with customary prior art practice.

*Example B*

| | Parts |
|---|---|
| Indene resin | 45 |
| Ethyl cellulose (20 c. p. s.) | 10 |
| Diphenyl phthalate | 45 |
| Isopropyl acetate | 200 |

Isopropyl acetate is a volatile organic liquid solvent for all the materials employed.

The solid components may be dissolved all together in the isopropyl acetate with or without the application of heat.

This makes a coatable composition which after being deposited as a film or layer and dried by evaporation of the isopropyl acetate is transparent and homogeneous. The temperature of incipient tackiness before heat activation is substantially the same as that obtained after activating and is approximately 100° F. Likewise the adhesive temperature required initially is substantially the same as the adhesive temperature required after such activation and subsequent cooling and is approximately 125° F.

It will be noted that in the foregoing Example B the plasticizing effect of diphenyl phthalate is evident equally before and after heating. In Example A there is evident both from the temperature of incipient tackiness and from the adhesive temperature the existence of a very definite plasticizing property made available after heating but which is held latent before such heating. Furthermore, the temperature of incipient tackiness in Example B of approximately 100° F. indicates risk of troublesome tackiness during storage and handling in summer weather whereas in Example A, before heat activation, the corresponding temperature is 140° F., providing ample margin even for summer temperatures.

As indicated by Examples A and B, it may be anticipated that those materials hitherto utilized in solution in accordance with the practices of the prior art in the manufacture of thermosensitive adhesives may, if compounded with suitable compatible crystalline plasticizer, be utilized in accordance with the principles of the present invention.

In the above description I have referred to certain temperatures and given thermometric values therefor. In most practical applications these temperatures will be easily apprehended as corresponding to ranges of temperature of practical significance in use. In a sense it might be said that initial non-tackiness and the fact that the material after having once been heated will thereafter become sticky at a temperature substantially lower than at such first heating characterizes the invention. For definiteness and to provide for distinguishing a substantial plasticizing effect which is characterstic of the invention and as hereinafter referred to and one which realizes its advantages in practical applications in the arts, standard procedures for determining the significant thermal points with a sufficient degree of scientific accuracy for such purposes are desirable. Before proceeding with further examples I shall describe such procedures.

The temperature of incipient tackiness, referred to above, I shall hereinafter call the "threshold tack temperature." This expression denotes the least perceptible degree of adherence, which is slight, and should not be taken to denote useful adhesiveness. It does, however, indicate a degree of adherence that might cause practical difficulty owing to cling or incipient blocking of one ply to another in a roll or in a stack of successive plies. The threshold tack temperature is one measure of the latent property of becoming plasticized and may be determined and defined by the following procedure.

A sheet of paper relatively impervious to the coating composition is coated to yield a residual film of approximately 25 pounds per ream (500 sheets of paper each 24" x 36"). The coated sheet is hung at room temperature for 48 hours to ensure evaporation of volatile components. Specimens (2" x 2") are cut and stacked in pairs so that film coating is in contact with film coating. A pressure of 500 grams is applied over one square inch of area for 3 hours with the temperature maintained within plus or minus 1° F. In the above treatment series of similar specimens are subjected to temperatures varying by 5° intervals and covering the probable tack temperature range. The lowest temperature at which a discernible cling of one specimen to another is observed is called the "threshold tack temperature."

Then having determined the threshold tack temperature as described above, other specimens of the paper coated with this same composition and dried as described above are heated to render the coating adhesively soft and cooled for ten minutes at a temperature of 70° F. or at a lower temperature if required to render the coating non-tacky. The threshold tack temperature is then similarly determined on these heat activated specimens.

"Adhesive temperature," which is the lowest temperature at which useful adhesiveness is developed and which serves as another measure of the latent plasticizing property may be determined and defined by the following procedure.

A sheet of 60 pound kraft paper (basis 24" x 36"—500 sheets) of the type commonly used for gummed tape for carton closing is coated to yield a residual film of approximately 25 pounds on the above ream basis. The coated sheet is hung at room temperature for 48 hours to ensure evaporation of the volatile components. Specimens one quarter inch wide by two inches in length are cut with the grain of the paper in the long direction and placed together so that film coating is in contact with film coating and the specimens superimposed precisely in the one-quarter inch dimension and overlapped in the long dimension so that each projects at least one inch beyond the other. A suitable pressure, determined as hereinafter described (on Examples A and B this was equivalent to 100 pounds per square inch), is distributed over a one-quarter inch by one-half inch section of the overlying area (or one-eighth of a square inch) for one minute with the back of one specimen in contact with the heated surface of a plate maintained within plus or minus 1° F. In the above treatment series of similar specimens are subjected to plate temperatures varying by 5° intervals and covering the probable adhesive temperature range. The specimens are then removed from the heater, placed in a Schopper tensile tester at 70° F. and subjected to tensile strain in the long direction until rupture occurs. The lowest temperature of joining which will yield specimens which rupture in the kraft paper rather than in the adhesive juncture is called the adhesive temperature. Then having determined the adhesive temperatures as described above, other specimens of the paper coated with the same composition and dried as described above are heated to render the coating adhesively soft and cooled for ten minutes at the temperature of 70° F. or at a lower temperature if required to render the coating non-tacky. The adhesive temperature is then similarly determined on these heat-activated specimens.

Hereinafter I shall use the term "initial threshold tack temperature" to mean the temperature determined prior to heat activation. I shall similarly use the term "initial adhesive temperature" to mean the temperature determined initially during the heat activation. The terms "subsequent threshold tack temperature" and "subsequent adhesive temperature" will mean the respective determinations made after heat activation and subsequent cooling of the specimen.

I have used in the foregoing the terms "activation," "adhesive activation," etc. When used in connection with discrete particle compositions having a latent plasticizing property as illustrated by Example A, the "activation temperature" is that temperature at which the discrete particle components melt or fuse with the other components of a given composition. This may be determined and defined according to the following procedure.

A sheet of dark colored paper relatively impervious to the coating composition is coated to yield a residual film of approximately 25 pounds per ream (500 sheets of paper each 24" x 36"). The coated sheet is hung at room temperature for 48 hours to ensure evaporation of the volatile components. An unheated specimen one-quarter inch by two inches, or more, is cut and wrapped about the bottom and two sides of a section of cork having a bottom face one-quarter inch wide by at least one-quarter inch long, so that a one-quarter inch square area of the specimen (or one-sixteenth of a square inch) is exposed on the bottom face. The specimen, coated face outward, is fastened tightly to the side faces of the cork so that the bottom area of the specimen is held smoothly in position. Over the coated face is fastened a single layer of 25 pound glassine (500 sheets 24" x 36"). The specimen and the masking glassine, backed by the cork and under pressure of five hundred gram weight on the back of the cork, is placed for five minutes with the glassine in contact with the flat surface of a heated element having its surface temperature maintained within plus or minus approximately 1° F. In the above treatment series of similar specimens are subjected to plate temperatures varying by 2° intervals and covering the probable activation range. The lowest temperature at which the relatively light colored discrete particle coating is fused and rendered transparent and therefore darker colored due to the dark backing paper showing through is called the "activation temperature."

The activation temperature for Example A, determined according to this procedure, was found to be 162° F.

It will be understood that in practical applications activation is usually carried out at higher temperatures than indicated by this procedure and I customarily employ such higher temperatures in preparing specimens for tests of subsequent threshold tack temperature and subsequent adhesive temperature in order to ensure that the discrete particles have not only been melted but have been well mingled with each other and with the other components of the composition so that results will be consistent.

Compositions illustrative of the invention are adhesive at the activation temperature as herein defined if the pressure employed for adhesive joining is sufficient to result in adequate flow of the compositions. That is, if the materials have melted into coalescence they will stick if sufficiently well pressed together. Without attempting exactitude of expression, the reader will understand that, given a composition and a certain stage of viscosity or stickiness, if we increase the pressure short of squeezing the material out of the joint, we are more likely to get good adhesion. Hence an arbitrarily determined pressure might be favorable for a composition at one temperature and less favorable at another temperature. Therefore, in order to measure the latent property of becoming plasticized which we have here under discussion, I choose for the pressure employed in determining the initial adhesive temperature one which will result in an initial adhesive temperature approximately equal to the activation temperature. When this same pressure is then later employed in determining the subsequent adhesive temperature, the difference in the initial and subsequent temperatures is a fair measure of the latent plasticizing property. Thus instead of the 100 pounds per square inch pressure employed in the case of Examples A and B, I may use in other cases any suitable pressure from 10 pounds to 1000 pounds or more as may be required. In later examples there is given in each case the pressure employed for that example. It is not to be understood, however, that pressures equal to or in the same order of magnitude as these pressures are necessarily employed or required in the practical utilization of the compositions referred to. In the case of Example A the initial adhesive temperature on 100 pounds pressure per square inch is approximately 165° F. The activation temperature has been given as approximately 162° F. This is adequately close adjustment of the pressure employed for the determination of adhesive temperatures.

It may be noted that in the procedures described for the determination of numerical values for adhesive pressures two films of adhesive are brought into contact one with another. This, however, does not mean that the compositions are cohesives only or that they necessarily require coatings to be applied to both of two objects to be joined. In the case of a label, for example, in general the coating on the back of the label would be activated and applied to an object not prepared therefor in any manner except that it should be clean and dry and at a suitable temperature so that it will not either unduly chill the adhesive on the one hand or cause it to flow away on the other.

From analogy with the known melting properties of mixtures of crystalline materials and by analogy with the phenomena of super-cooling, I incline to the belief that any composition containing crystalline discrete particle components on the one hand and resinous or polymeric adhesive compounds on the other, if the components be substantially compatible or soluble one in another after melting together, will have to some degree this latent property of becoming plasticized. However, assuming that this is a general physical law, my invention contemplates the useful application thereof in the practical arts in compositions wherein this property is present in a significant degree as evidenced by a subsequent threshold tack temperature that is 10° F. or more lower than the initial threshold tack temperature and, furthermore, as evidenced by a subsequent adhesive temperature that is 10° F. or more lower than the initial adhesive temperature determined in the manner above described. Furthermore, the plasticizing effect to be practically useful should persist for a substantial period of time even although eventual crystallization out of the plasticizing ingredient may occur. A plasticizing effect persistent through a reasonable time of handling is of practical utility. Thus activation of the film in preparation for application would normally be extemporaneous or substantially so and even in an extreme case the user would not wish to activate at one time more than the current day's supply.

By choosing from among pronouncedly crystalline materials and resinous and polymeric materials with which they are compatible and varying the proportions of these ingredients, the threshold tack temperature and the adhesive temperature of the composition before and after activation can be varied within wide limits according to requirements. More than one crystalline material may be employed and likewise more than one resinous or polymeric material. The crystalline material may be the only one in dispersed solid form but any one or several or substantially all of the other materials may likewise be in such dispersed solid form. Where one or more resinous or polymeric components are deposited from a solution form they may serve as a binder superficially agglomerating the discrete particles of crystalline material (insoluble in the solvent) which may be mixed into the initial solution. The composition may thus be applied as a coating to a carrier or article and take the form of a film at least superficially coherent and adherent to the surface. Many such resinous or polymeric components deposited from a dispersed form will coalesce sufficiently on evaporation of a dispersing vehicle to serve as such a binder. Extraneous material incompatible with the thermoplastic components under the conditions of preparation and not essential in the eventual adhesive function of the composition may serve as a superficial binding agent. This is illustrated in Example C hereinafter.

I may add other ingredients such as dyes, pigments, disinfectants, insecticides, fungicides, binders, wetting and dispersing agents, or odorants to the composition to add other desirable properties to the product. If such other ingredients are judiciously chosen and not admixed in excessive amounts they do not destroy the characteristic properties of the compositions of my invention which have been described.

In the following examples I illustrate with diverse materials in varying proportions a few of the many types of composition that may be usefully employed in accordance with the principles of this invention.

Example A illustrates a composition after the principles of this invention that is prepared with alcohol as the volatile vehicle material. It will be understood that other volatile liquids may be similarly employed in this and in other compositions provided they be so chosen that the crystalline latent plasticizing component remains in large part undissolved during the preparation of the composition and the deposition and drying of the film or layer.

Water is an especially desirable volatile vehicle material both for economy and for its non-solvent behavior with many useful crystalline components. I will illustrate with the following example how a residual film of similar basic components and which approximates that of Example A in its adhesive behavior may be prepared with an aqueous vehicle.

*Example C*

| | Parts by weight |
|---|---|
| Indene resin | 45 |
| Ethyl cellulose | 10 |
| Diphenyl phthalate | 45 |
| "Amine dispersant" | 6 |
| Water | 169 |
| "Acrysol M. R."—(50% solids) | 10 |

Indene resin, diphenyl phthalate and ethyl cellulose are of the same source and grade as used in Example A. It will be noted that ethyl cellulose is prepared in discrete particle form rather than in solution. All are insoluble in water.

"Amine dispersant" comprises 1 part stearic acid, 1 part "Polypale resin," a polymerized rosin containing approximately 40% dipolymers of abietic acid, (Hercules Powder Company), 1 part of an amino compound (2 amino-2 methyl-1 propanol, from Commercial Solvents Corporation), and 3 parts of water. This composition is designed solely as a dispersing assistant to promote good dispersion of the components in water. Many other useful dispersants will be suggested to a chemist skilled in making aqueous dispersions.

"Acrysol M. R." is an aqueous dispersion of polyacrylic resin and is sold by Resinous Products & Chemical Company. This material coalesces on evaporation of the water to form a supplementary binding component which superficially holds together the discrete particles of indene resin, diphenyl phthalate and ethyl cellulose and binds them to the surface to which the composition will be applied.

The 6 parts of "Amine dispersant" are added to the 169 parts of water and well stirred. The indene resin, previously dry ground, is added to 90 parts of the above thinned "Amine dispersant" and ground in a ball mill until in an adequately fine state of dispersion. The diphenyl phthalate is added to 70 parts of thinned "Amine dispersant" and similarly ground. The ethyl cellulose is added to 15 parts of thinned "Amine dispersant" and similarly ground, but usually for a longer period than is required for the other materials since an adequately fine state of dispersion is gained more slowly.

Alternately, all three of the above components may be ground together in the thinned "Amine dispersant" or any pair of these components may be so ground together.

When sufficiently ground the above dispersions are mixed together and the "Acrysol M. R." added and the whole composition well stirred.

This makes a coatable aqueous composition from which a residual film or layer may be deposited that is not greatly different from that of Example A in its adhesive behavior. The dried film or layer is opaque and consists of discrete particles of indene resin, diphenyl phthalate and ethyl cellulose superficially bound together by coalesced polyacrylic resin.

The initial threshold tack temperature of the composition is approximately 140° F. and the subsequent threshold tack temperature is approximately 100° F.—both similar to the respective temperatures given for Example A.

The activation temperature is approximately 152° F.

The intial adhesive temperature, determined at 100 pounds pressure, is approximately 155° F. and the subsequent adhesive temperature approximately 115° F.

I will now show by different examples how the amount of crystalline component relative to the amount of adhesive component may be varied and the character of the composition as a whole varied while still exhibiting in each case a significant plasticizing effect as demonstrated by a lowering of the threshold tack temperature and the adhesive temperature after activation. It will be understood that in each case other crystalline components and other adhesive components, if chosen in suitable proportion, may be added to these compositions to yield compositions of varying properties without departing from the principles of this invention.

The first set of examples which follow are simple compositions comprising the minimum of two non-volatile components, diphenyl phthalate and ethyl cellulose.

|  | Parts by Weight | | |
|---|---|---|---|
|  | Diphenyl Phthalate | Ethyl Cellulose | Ethyl Alcohol |
| Example 1a | 50 | 50 | 175 |
| Example 1b | 40 | 60 | 180 |

Diphenyl phthalate, ethyl cellulose and alcohol are of the same source and grade as used in Example A.

A solution in the proportion of 5 parts ethyl cellulose to 95 parts alcohol and in an amount equivalent to one and one-half times the amount of diphenyl phthalate is prepared and added to the diphenyl phthalate. The composition is ground in a ball mill until in a suitably fine state of dispersion.

The remaining ethyl cellulose is dissolved in the remaining alcohol and added to the above dispersion.

Coatings prepared and tested according to the procedures above described (following Example B) show threshold tack, activation and adhesive temperatures approximately as follows:

|  | Significant Temperature in Degrees F. | | | | |
|---|---|---|---|---|---|
|  | Threshold Tack | | Activation | Adhesive | |
|  | Initial | Subsequent | | Initial | Subsequent |
| Example 1a | 160 | 90 | 161 | [1] 167 | [1] 120 |
| Example 1b | 160 | 140 | 165 | [2] 165 | [2] 145 |

[1] Taken at 100 pounds pressure per square inch.
[2] Taken at 1,000 pounds pressure per square inch.

Example series 2 which follows illustrates how similar proportions of diphenyl phthalate and ethyl cellulose may be employed in aqueously dispersed form after the manner of Example C. The properties of the residual film compositions are not greatly different from the properties of the corresponding residual film compositions of example series 1, as will be shown:

|  | Parts by Weight | | | |
|---|---|---|---|---|
|  | Diphenyl Phthalate | Ethyl Cellulose | Thinned Amine Dispersant | Acrysol M. R. (50% Solids) |
| Example 2a | 50 | 50 | 240 | 10 |
| Example 2b | 40 | 60 | 240 | 10 |

Diphenyl phthalate, ethyl cellulose and Acrysol M. R. are of the same source and grades used in Example C.

Thinned "Amine Dispersant" comprises 6 parts of "Amine dispersant," made as described for Example C, thinned with 234 parts of water.

The diphenyl phthalate and the ethyl cellulose are added to the thinned "Amine dispersant" and ground in a ball mill until in a suitably fine state of dispersion.

The "Acrysol M. R." is added to the above ground dispersion and the whole composition well stirred. Coatings prepared and tested as described above show significant temperatures approximately as follows:

|  | Significant Temperature in Degrees F. | | | | |
|---|---|---|---|---|---|
|  | Threshold Tack | | Activation | Adhesive | |
|  | Initial | Subsequent | | Initial | Subsequent |
| Example 2a | 160 | 90 | 161 | [1] 167 | [1] 115 |
| Example 2b | 160 | 140 | 161 | [2] 160 | [2] 137 |

[1] Taken at 100 pounds pressure per square inch.
[2] Taken at 1000 pounds pressure per square inch.

Example series 3 will illustrate the effect of varying proportions when another crystalline component, "Plasticizer 7," is used in place of diphenyl phthalate in compositions prepared substantially as in example series 2.

|  | Parts by Weight | | | |
| --- | --- | --- | --- | --- |
|  | Plasticizer 7 | Ethyl Cellulose | Thinned Amine Dispersant | Acrysol M. R. (50% Solids) |
| Example 3a | 75 | 25 | 240 | 10 |
| Example 3b | 50 | 50 | 240 | 10 |
| Example 3c | 40 | 60 | 240 | 10 |
| Example 3d | 33 | 67 | 240 | 10 |

"Plasticizer 7" is made by Dow Chemical Company and is their name for tri para tertiary-butyl phenyl phosphate.

Ethyl cellulose, thinned "Amine dispersant" and "Acrysol M. R." are similar to the respective materials used in example series 2.

Coatings prepared and tested as described above show significant temperatures approximately as follows:

|  | Significant Temperature in Degrees F. | | | | |
| --- | --- | --- | --- | --- | --- |
|  | Threshold Tack | | Activation | Adhesive | |
|  | Initial | Subsequent |  | Initial | Subsequent |
| Example 3a | 177 | 65 | 199 | 210 | 117 |
| Example 3b | 180 | 137 | 204 | 200 | 137 |
| Example 3c | 190 | 160 | 206 | 205 | 175 |
| Example 3d | 190 | 180 | 210 | 205 | 190 |

Adhesive temperature determinations were all made at 100 pounds per square inch.

Example series 4 will illustrate the effect of varying proportions when a different crystalline component, "Santicizer 1H," is used in place of diphenyl phthalate in compositions prepared substantially as series 2 and series 3.

|  | Parts by Weight | | | |
| --- | --- | --- | --- | --- |
|  | Santicizer 1H | Ethyl Cellulose | Thinned Amine Dispersant | Acrysol M. R. (50% Solids) |
| Example 4a | 75 | 25 | 240 | 10 |
| Example 4b | 50 | 50 | 240 | 10 |

"Santicizer 1H" is made by Monsanto Chemical Company and is their name for cyclohexyl para-toluene sulfonamide.

Ethyl cellulose, thinned "Amine dispersant" and "Acrysol M. R." are similar to the respective materials used in example series 2 and 3.

Coatings prepared and tested as described above show significant temperatures approximately as follows:

|  | Significant Temperature in Degrees F. | | | | |
| --- | --- | --- | --- | --- | --- |
|  | Threshold Tack | | Activation | Adhesive | |
|  | Initial | Subsequent |  | Initial | Subsequent |
| Example 4a | 157 | Below 50 | 174 | 170 | Below 50 |
| Example 4b | 160 | 87 | 174 | 170 | 100 |

Adhesive temperature determinations were made under 100 pounds pressure per square inch.

Example series 5 will illustrate the effect of varying proportions when another polymeric material, "Acrysol M. R.," is substituted for the ethyl cellulose which is used in the preceding examples. The compositions of series 5 are prepared in a manner similar to those of example series 2 excepting that ethyl cellulose is omitted and "Acrysol M. R.," used in more substantial proportion than heretofore, is substituted therefor.

|  | Parts by Weight | | |
| --- | --- | --- | --- |
|  | Diphenyl Phthalate | Thinned Amine Dispersant | Acrysol M. R. (50% Solids) |
| Example 5a | 75 | 180 | 50 |
| Example 5b | 50 | 120 | 100 |
| Example 5c | 25 | 60 | 150 |

Diphenyl phthalate, thinned "Amine dispersant" and "Acrysol M. R." are similar to the respective materials used in example series 2.

Coatings prepared and tested as described above show significant temperatures approximately as follows:

|  | Significant Temperature in Degrees F. | | | | |
| --- | --- | --- | --- | --- | --- |
|  | Threshold Tack | | Activation | Adhesive | |
|  | Initial | Subsequent |  | Initial | Subsequent |
| Example 5a | 130 | Below 50 | 162 | 160 | Below 70 |
| Example 5b | 105 | Below 50 | 152 | 150 | 112 |
| Example 5c | 92 | 70 | 136 | 137 | 127 |

Adhesive temperature determinations were all made at 10 pounds pressure per square inch.

Example series 6 will illustrate the effect of varying proportions when another polymeric material, "Geon 11X," is substituted for the ethyl cellulose. The compositions of series 6 are prepared in a manner similar to those of example series 5 excepting that "Geon 11X" has in large part replaced the "Acrysol M. R." Since the "Geon 11X" does not coalesce upon evaporation of the water, there has been retained in the formula sufficient "Acrysol M. R." to serve as a superficial binding component.

|  | Parts by Weight | | | |
| --- | --- | --- | --- | --- |
|  | Diphenyl Phthalate | Thinned Amine Dispersant | Geon 11X (51% Solids) | Acrysol M. R. (50% Solids) |
| Example 6a | 75 | 180 | 49 | 10 |
| Example 6b | 50 | 120 | 98 | 10 |
| Example 6c | 40 | 96 | 117 | 10 |
| Example 6d | 33 | 79 | 131 | 10 |

Diphenyl phthalate, thinned "Amine dispersant" and "Acrysol M. R." are similar to the respective materials used in example series 2.

"Geon 11X" is an aqueous dispersion of a copolymer of vinyl chloride and vinylidene chloride resin and is sold by B. F. Goodrich Company. Unlike "Acrysol M. R." it does not coalesce upon evaporation of the water when dried at the moderate temperatures usually employed with aqueous compositions and "Acrysol M. R." has been added, to serve primarily as a superficial binding component.

Coatings prepared and tested as described above show significant temperatures approximately as follows:

|  | Significant Temperature in Degrees F. | | | | |
|---|---|---|---|---|---|
|  | Threshold Tack | | Activation | Adhesive | |
|  | Initial | Subsequent |  | Initial | Subsequent |
| Example 6a | 142 | Below 50 | 160 | 167 | 85 |
| Example 6b | 130 | 85 | 170 | 170 | 135 |
| Example 6c | 125 | 110 | 168 | 170 | 155 |
| Example 6d | 125 | 110 | 170 | 170 | 160 |

Adhesive temperature determinations were all at 100 pounds pressure per square inch.

Example series 7 will illustrate the effect of varying proportions when still another polymeric material, GRS type 3 latex, is substituted for the ethyl cellulose and "Plasticizer 7" is employed as the crystalline material. The compositions of series 7 are prepared in a manner similar to those of series 5 excepting that "Acrysol M.R." is replaced by GRS latex, type 3, and diphenyl phthalate is replaced by "Plasticizer 7."

|  | Parts by Weight | | |
|---|---|---|---|
|  | Plasticizer 7 | Thinned Amine Dispersant | GRS Latex Type 3 (40% Solids) |
| Example 7a | 85 | 204 | 37½ |
| Example 7b | 75 | 180 | 62½ |

Thinned "Amine dispersant" is similar to that used in example series 2.

"Plasticizer 7" is similar to that used in example series 3.

GRS latex, type 3, is a synthetic rubber latex of the type also known as Buna S (butadiene copolymer with styrene) without anti-oxidant or vulcanizing additives. It is obtainable from General Latex and Chemical Corporation.

Coatings prepared and tested as described above show significant temperatures approximately as follows:

|  | Significant Temperature in Degrees F. | | | | |
|---|---|---|---|---|---|
|  | Threshold Tack | | Activation | Adhesive | |
|  | Initial | Subsequent |  | Initial | Subsequent |
| Example 7a | 142 | Below 0 | 177 | 177 | Below 50 |
| Example 7b | 110 | Below 0 | 173 | 170 | Below 50 |

Adhesive temperature determinations were all at 1000 pounds pressure per square inch.

Example series 8 will illustrate effect of varying proportions when still another polymeric material, "Hycar OR–25" dispersion, is substituted for ethyl cellulose. In this series diphenyl phthalate is employed as the crystalline material. The compositions of series 8 are prepared in a manner similar to those of series 5 excepting that "Acrysol M.R." is replaced by "Hycar OR–25."

|  | Parts by Weight | | |
|---|---|---|---|
|  | Diphenyl Phthalate | Thinned Amine Dispersant | Hycar OR–25 (40% Solids) |
| Example 8a | 85 | 204 | 37½ |
| Example 8b | 75 | 180 | 62½ |

Diphenyl phthalate and thinned "Amine dispersant" are similar to the respective materials used in example series 5.

Hycar OR–25 is an aqueous dispersion of synthetic rubber of the type known as Buna N, a co-polymer in the approximate proportion of 75% butadiene and 25% acrylonitrile, without anti-oxidant or vulcanizing additives. It is obtainable from Hycar Chemical Company.

Coatings prepared and tested as described above show significant temperatures approximately as follows:

|  | Significant Temperature in Degrees F. | | | | |
|---|---|---|---|---|---|
|  | Threshold Tack | | Activation | Adhesive | |
|  | Initial | Subsequent |  | Initial | Subsequent |
| Example 8a | 140 | 0 | 160 | 160 | Below 50 |
| Example 8b | 100 | Below 50 | 151 | 150 | Below 50 |

Adhesive temperature determinations were all at 100 pounds pressure per square inch Example series 9 will illustrate the effect of varying proportions when a material of lower polymeric structure, in the class commonly known as resinous materials, is substituted for the ethyl cellulose and other polymeric adhesive materials of my prior examples. The compositions of series 9 are prepared in a manner similar to those of example series 4 excepting that "Vinsol" resin (previously dry ground) is substituted for the ethyl cellulose. I have already stated in connection with the examples given in this specification that in general other crystalline and resinous adhesive components, if compatible and chosen in suitable proportion, may be added to vary the properties of the resultant compositions without departing from the principles of the invention. As a particular application of this in the case of the present example and some of those immediately following wherein the potentially adhesive component specified is a resin having a relatively short adhesive range other compatible components of higher polymeric structure and tougher than such resin (for example, "Vinsol") may advantageously be added to enhance the adhesiveness of the resulting compositions.

|  | Parts by Weight | | | |
|---|---|---|---|---|
|  | Santicizer 1H | Vinsol Resin | Thinned Amine Dispersant | Acrysol M. R. (50– Solids) |
| Example 9a | 75 | 25 | 240 | 10 |
| Example 9b | 50 | 50 | 240 | 10 |
| Example 9c | 25 | 75 | 240 | 10 |

"Santicizer 1H," thinned "Amine dispersant" and "Acrysol M. R." are similar to the respective materials used in example series 4.

"Vinsol" is a pinewood resin having an acid number of approximately 92, a drop melting point of 119° C., a saponification number of 150 and containing approximately 6.5% of unsaponifiable matter, and is obtainable from Hercules Powder Company.

Coatings prepared and tested as described above show significant temperatures approximately as follows:

|  | Significant Temperature in Degrees F. | | | | |
|---|---|---|---|---|---|
|  | Threshold Tack | | Activation | Adhesive | |
|  | Initial | Subsequent | | Initial | Subsequent |
| Example 9a | 125 | Below 50 | 146 | ¹ 142 | ¹ Below 50 |
| Example 9b | 122 | Below 50 | 146 | ¹ 150 | ¹ 100 |
| Example 9c | 125 | 105 | 157 | ² 155 | ² 133 |

¹ Taken at 100 pounds pressure per square inch.
² Taken at 1,000 pounds pressure per square inch.

Example series 10 will illustrate the effect of substituting another resin, "Aroclor 5460," for the "Vinsol" resin used in series 9. The compositions of series 10 are prepared in a manner similar to those of series 9.

|  | Parts by Weight | | | |
|---|---|---|---|---|
|  | Santicizer 1H | Aroclor 5460 | Thinned Amine Dispersant | Acrysol M. R. (50% Solids) |
| Example 10a | 75 | 25 | 240 | 10 |
| Example 10b | 50 | 50 | 240 | 10 |
| Example 10c | 25 | 75 | 240 | 10 |

"Santicizer 1H," thinned "Amine dispersant" and "Acrysol M. R." are similar to the respective materials used in example series 4.

"Aroclor 5460" is a chlorinated diphenyl resin manufactured by Monsanto Chemical Company.

Coatings prepared and tested as described above show significant temperatures approximately as follows:

|  | Significant Temperature in Degrees F. | | | | |
|---|---|---|---|---|---|
|  | Threshold Tack | | Activation | Adhesive | |
|  | Initial | Subsequent | | Initial | Subsequent |
| Example 10a | 145 | Below 50 | 167 | ¹ 162 | ¹ Below 50 |
| Example 10b | 135 | Below 70 | 156 | ¹ 160 | ¹ Below 70 |
| Example 10c | 130 | Below 85 | 155 | ² 152 | ² 112 |

¹ Taken at 100 pounds pressure per square inch.
² Taken at 1,000 pounds pressure per square inch.

Example series 11 will illustrate the substitution of another crystalline material, "Plasticizer 7" for the "Santicizer 1H" used in series 9 and series 10. The compositions of series 11 are prepared in a manner similar to those of series 9.

|  | Parts by Weight | | | |
|---|---|---|---|---|
|  | Plasticizer 7 | Vinsol Resin | Thinned Amine Dispersant | Acrysol M. R. (50% Solids) |
| Example 11a | 75 | 25 | 240 | 10 |
| Example 11b | 50 | 50 | 240 | 10 |
| Example 11c | 25 | 75 | 240 | 10 |

"Plasticizer 7" is similar to that used in example series 3.

"Vinsol" resin is similar to that used in example series 9.

Thinned "Amine dispersant" and "Acrysol M. R." are similar to the respective materials used in example series 4.

Coatings prepared and tested as above show significant temperatures approximately as follows:

|  | Significant Temperature in Degrees F. | | | | |
|---|---|---|---|---|---|
|  | Threshold Tack | | Activation | Adhesive | |
|  | Initial | Subsequent | | Initial | Subsequent |
| Example 11a | 155 | Below 50 | 172 | ¹ 177 | ¹ Below 50 |
| Example 11b | 145 | Below 85 | 164 | ¹ 170 | ¹ 112 |
| Example 11c | 140 | 130 | 163 | ¹ 160 | ¹ 145 |

¹ Taken at 1,000 pounds pressure per square inch.

Example series 12 will illustrate the effect of substituting another crystalline material, diphenyl phthalate, for the "Santicizer 1H" used in series 10. The compositions of series 12 are otherwise prepared in a manner similar to those of series 10.

|  | Parts by Weight | | | |
|---|---|---|---|---|
|  | Diphenyl Phthalate | Aroclor 5460 | Thinned Amine Dispersant | Acrysol M. R. (50% Solids) |
| Example 12a | 75 | 25 | 240 | 10 |
| Example 12b | 50 | 50 | 240 | 10 |
| Example 12c | 25 | 75 | 240 | 10 |

Diphenyl phthalate is similar to that used in Example A.

"Aroclor 5460" is similar to that used in example series 10.

Thinned "Amine dispersant" and "Acrysol M. R." are similar to the respective materials used in example series 4.

Coatings prepared and tested as above show significant temperatures approximately as follows:

|  | Significant Temperature in Degrees F. | | | | |
|---|---|---|---|---|---|
|  | Threshold Tack | | Activation | Adhesive | |
|  | Initial | Subsequent | | Initial | Subsequent |
| Example 12a | 135 | Below 50 | 153 | ¹ 150 | ¹ Below 50. |
| Example 12b | 130 | Below 50 | 143 | ¹ 140 | ¹ Below 50. |
| Example 12c | 130 | Below 85 | 155 | ¹ 145 | ¹ 85. |

¹ Taken at 1,000 pounds pressure per square inch.

Example series 13 will illustrate the effect of substituting another resin, "Nevindene R-3," for the "Aroclor 5460" used in series 12. The compositions of series 13 are otherwise prepared in a manner similar to those of series 12.

|  | Parts by Weight | | | |
|---|---|---|---|---|
|  | Diphenyl Phthalate | Nevindene R-3 | Thinned Amine Dispersant | Acrysol M. R. (50% Solids) |
| Example 13a | 75 | 25 | 240 | 10 |
| Example 13b | 50 | 50 | 240 | 10 |
| Example 13c | 25 | 75 | 240 | 10 |

Diphenyl phthalate and Nevindene R-3 are similar to the respective materials used in Example A.

Thinned "Amine dispersant" and "Acrysol M. R." are similar to the respective materials used in example series 4.

Coatings prepared and tested as above show significant temperatures approximately as follows:

|  | Significant Temperature in Degrees F. | | | | |
| --- | --- | --- | --- | --- | --- |
|  | Threshold Tack | | Activation | Adhesive | |
|  | Initial | Subsequent | | Initial | Subsequent |
| Example 13a | 132 | Below 50 | 148 | ¹ 150 | ¹ Below 50. |
| Example 13b | 130 | 72 | 146 | ¹ 150 | ¹ 80. |
| Example 13c | 137 | 105 | 165 | ¹ 162 | ¹ 147. |

¹ Taken at 100 pounds pressure per square inch.

Example series 14 will illustrate the effect of substituting another crystalline material, acetanilid, for the "Plasticizer 7" used in series 11. The compositions of series 14 are otherwise prepared in a manner similar to those of series 11.

|  | Parts by Weight | | | |
| --- | --- | --- | --- | --- |
|  | Acetanilid | Vinsol Resin | Thinned Amine Dispersant | Acrysol M. R. (50% Solids) |
| Example 14a | 75 | 25 | 240 | 10 |
| Example 14b | 50 | 50 | 240 | 10 |
| Example 14c | 25 | 75 | 240 | 10 |

Acetanilid is of U. S. P. XI grade.

Other materials are similar to the respective materials used in example series 11.

Coatings prepared and tested as above show significant temperatures approximately as follows:

|  | Significant Temperature in Degrees F. | | | | |
| --- | --- | --- | --- | --- | --- |
|  | Threshold Tack | | Activation | Adhesive | |
|  | Initial | Subsequent | | Initial | Subsequent |
| Example 14a | 135 | Below 0 | 176 | ¹ 173 | ¹ Below 50. |
| Example 14b | 120 | Below 50 | 154 | ¹ 155 | ¹ Below 50. |
| Example 14c | 115 | 70 | 141 | ² 135 | ² 112. |

¹ Taken at 20 pounds pressure per square inch.
² Taken at 50 pounds pressure per square inch.

Example 15 will illustrate a (type of) composition which is non-tacky at normal conditions of storage and handling, which requires relatively low temperatures for sealing and which has been found useful as a coating for heat-sealing labels.

*Example 15*

| | Parts by weight |
| --- | --- |
| Diphenyl phthalate | 30 |
| Plasticizer 7 | 10 |
| Nevindene R-3 | 40 |
| Thinned Amine dispersant | 192 |
| GRS latex—type 3 (40% solids) | 37½ |
| Geon 11X (51% solids) | 9⅘ |

These materials are similar to the respective materials used in various of my foregoing examples.

The diphenyl phthalate is ground in a ball mill with 72 parts of thinned "Amine dispersant" until of suitable fineness.

The "Plasticizer 7" is similarly ground with 24 parts of thinned "Amine dispersant."

The "Nevindene R-3" (previously dry ground) is similarly ground with 96 parts of thinned "Amine dispersant."

The above ground dispersions are well mixed by stirring and are then added to the GRS latex and the Geon 11X stirred together.

Coatings prepared and tested as above show significant temperatures approximately as follows:

*Significant temperature in degrees F.*

Threshold tack:
　Initial _____ 115
　Subsequent _____ below 50
Activation _____ 132
Adhesive:
　Initial _____ 135
　Subsequent _____ below 85

Adhesive determinations are made at 100 pounds pressure per square inch.

Example 16 will illustrate a type of composition which is non-tacky at normal conditions of storage and handling, which may be activated by heating and which after such activation may be adhesively employed at normal room temperatures. Such composition, when coated on paper or other suitable backing material, has been found useful for labels designed for application to bottles, cans and other rigid objects.

*Example 16*

| | Parts by weight |
| --- | --- |
| Plasticizer 7 | 72 |
| Nevindene R-3 | 10 |
| Thinned Amine dispersant | 196 |
| GRS latex—Type 3 (40% solids) | 45 |

These materials are similar to the respective materials used in various of my foregoing examples.

The "Plasticizer 7" is ground in a ball mill with 172 parts of thinned "Amine dispersant" until of suitable fineness.

The "Nevindene R-3" (previously dry ground) is similarly ground with 24 parts of thinned "Amine dispersant."

The ball mill ground "Plasticizer 7" and "Nevindene R-3" are well stirred and added to the GRS latex.

Coatings prepared and tested as above show significant temperatures approximately as follows:

*Significant temperature in degrees F.*

Threshold tack:
　Initial _____ 145
　Subsequent _____ below 50
Activation _____ 174
Adhesive:
　Initial _____ 175
　Subsequent _____ below 50

Adhesive determinations are made at 50 pounds pressure per square inch.

Example 17 will illustrate a composition in which Buna N (Hycar Chemical Company) is used in place of the GRS latex, type 3, of Example 16 and which is rather similar to Example 16 composition in general properties and usefulness.

Example 17

| | Parts by weight |
|---|---|
| Diphenyl phthalate | 67½ |
| Vinsol resin | 10 |
| Thinned Amine dispersant | 186 |
| Hycar OR-25 (40% solids) | 56 |

These materials are similar to the respective materials used in various of my foregoing examples.

The diphenyl phthalate is ground in a ball mill with 162 parts of thinned "Amine dispersant" until of suitable fineness.

The Vinsol resin (previously dry ground) is similarly ground with 24 parts of thinned "Amine dispersant."

The above ground dispersions are well stirred together and are then added to the "Hycar OR-25."

Coatings prepared and tested as above show significant temperatures approximately as follows:

*Significant temperature in degrees F.*

Threshold tack:
    Initial _____ 115
    Subsequent _____ below 50
Activation _____ 144
Adhesive:
    Initial _____ 140
    Subsequent _____ below 50

Adhesive determinations are made at 10 pounds pressure per square inch.

Example 18 will illustrate a composition of similar components to that of Example 17 excepting that Nevindene R-3 is used in place of Vinsol. This composition in general properties and usefulness is rather similar to the compositions of Examples 16 and 17.

Example 18

| | Parts by weight |
|---|---|
| Diphenyl phthalate | 52½ |
| Nevindene R-3 | 30 |
| Thinned Amine dispersant | 198 |
| Hycar OR-25 | 43½ |

These materials are similar to the respective materials used in various of my foregoing examples.

The diphenyl phthalate is ground in a ball mill with 126 parts of thinned "Amine dispersant" until of suitable fineness.

The "Nevindene R-3" is similarly ground with 72 parts of thinned "Amine dispersant."

The above ground dispersions are well stirred together and are then added to the "Hycar OR-25."

Coatings prepared and tested as above show significant temperatures as follows:

*Significant temperature in degrees F.*

Threshold tack:
    Initial _____ 100
    Subsequent _____ below 50
Activation _____ 142
Adhesive:
    Initial _____ 145
    Subsequent _____ below 50

Adhesive determinations are made at 10 pounds pressure per square inch.

Example 19 will illustrate a composition rather similar in general properties and usefulness to the compositions of Examples 16, 17 and 18 but with "Geon 11X" incorporated in the formula.

Example 19

| | Parts by weight |
|---|---|
| Plasticizer 7 | 50 |
| Aroclor 5460 | 30 |
| Thinned Amine dispersant | 192 |
| Geon 11X (51% solids) | 19½ |
| Hycar OR-25 (40% solids) | 25 |

These materials are similar to the respective materials used in various of my foregoing examples.

The "Plasticizer 7" is ground in a ball mill with 120 parts of thinned "Amine dispersant" until of suitable fineness.

The "Aroclor 5460" is similarly ground with 72 parts of thinned "Amine dispersant."

The above ground materials are well mixed by stirring and then they are added to the "Geon 11X" and the "Hycar OR-25" which have been previously stirred together.

Coatings prepared and tested as above show significant temperatures approximately as follows:

*Significant temperature in degrees F.*

Threshold tack:
    Initial _____ 120
    Subsequent _____ below 70
Activation _____ 147
Adhesive:
    Initial _____ 150
    Subsequent _____ below 70

Adhesive determinations are made at 10 pounds pressure per square inch.

It is apparent from the examples given that many different components may be utilized in the manufacture of compositions under the invention. Also new synthetic resins and polymers are constantly being developed and made commercially available, many of which undoubtedly will be found adaptable as components of adhesives. It is therefore not only impossible to attempt a comprehensive catalog of useful components but to attempt to apprehend or describe the invention in its broader aspects in terms of the chemical names of the components used would be misleading. The invention lies in the physical relation or mechanical correlation of suitable components and their individual composition is important only in the sense that the individual properties of the elements of any mechanical assemblage are important to their proper combination and coaction. To formulate a set of specifications for a composition in the light of the present disclosure will call for chemical knowledge and skill, but the office of the chemist will be like that of the mechanical engineer who prescribes in the construction of a machine the proper materials and the proper dimensions therefor. From his knowledge as a chemist of the materials available he will know or deduce with confidence their applicability to the purposes of the invention or, otherwise, and in the case of novel materials, routine tests not of an inventive nature will provide reliable data. In analogy to the case of a machine wherein the use of certain materials of construction or dimensions of parts would lead to no practically useful result, various materials will be rejected as inapplicable while others operative as such and illustrative of the theoretical basis of the invention may not be practically useful because the significant temperatures or ranges of temperatures involved would not be particularly advantageous or find a particular application in the practical arts or because of consideration of the cost of the materials, etc. We may safely assume that no one will wish to make a useless composition or will be misled because it is possible to misapply the teachings of the present disclosure in order to do so.

In the appended claims, to avoid prolixity and awkwardness in expression "room temperature" is used to denote the atmospheric conditions, natural or otherwise, to which a particular product may be exposed during storage or at the place of use prior to intentional activation thereof. "Viscid" is understood as meaning sticky or tacky so as to adhere to an object. I use the expression "potentially viscid" because the materials under consideration are not, before activation, substantially tacky at room temperatures, but will, when heated within the range of pressures and temperatures at which adhesive operations are effected, either because of their inherent properties or their modification by accompanying plasticizer, exhibit such a degree of tack as to render the material practically useful to secure adhesion to an object. As illustrated by the examples given, such materials are polymeric in their nature including what are usually termed resins (natural and synthetic) and more complex polymeric materials. Reference to an adhesive temperature difference means such a difference as determined by the procedures herein described.

I claim:

1. As an adhesive a normally solid, megascopically homogeneous film, non-tacking at room temperatures and activatable to adhesiveness by heat, comprising a plurality of normally solid materials substantially compatible to merge on heating to provide a substantially homogeneous mass, one of the materials being an amorphous, potentially viscid, polymeric material and another a potential plasticizer for the same, the latter being present in the form of discrete crystalline particles intimately mechanically admixed in the film in substantially uniform proportions throughout the mass of the film, the plasticizer particles and the polymeric material coexisting in physically independent individuality, but merging on heating with release of the latent plasticizing property of the particles, the plasticizer being present in significant proportion to provide after heating a merged mixture having a temperature of adhesiveness, subsequent adhesive temperature, at least 10° F. lower than the temperature of adhesiveness, initial adhesive temperature, of the original film before such heating.

2. As an adhesive a normally solid, megascopically homogeneous film, non-tacking at room temperatures and activatable to adhesiveness by heat, comprising a plurality of normally solid materials substantially compatible to merge on heating to provide a substantially homogeneous mass, one of the materials being an amorphous, potentially viscid, polymeric material and another a potential plasticizer for the same, the latter being present in the form of discrete crystalline particles intimately mechanically admixed in the film in substantially uniform proportions throughout the mass of the film, the plasticizer particles and the polymeric material coexisting in physically independent individuality, but merging on heating with release of the latent plasticizing property of the particles, the plasticizer being present in significant proportion to provide a merged mixture which after subsequent cooling will have and retain for a substantial period an adhesiveness permitting its application to use at room temperatures without renewed heating.

3. A coherent, solid and megascopically homogeneous, potentially adhesive composition suitable for production as a megascopically continuous, thin, film-like layer to provide an intimate adhesive joint between two parts, said composition being non-tacky at room temperatures but activatable to adhesive softness by heat, and comprising an amorphous, potentially viscid, polymeric material and a crystalline plasticizer therefor which is present in the form of discrete particles substantially uniformly distributed throughout the mass of the composition in mechanical admixture therewith but in physically independent form, the plasticizer being present in significant proportion effective when the composition is heated to form a merged mixture having a temperature of adhesiveness, subsequent adhesive temperature, at least 10° F. lower than the temperature of adhesiveness of the mixture before heating, initial adhesive temperature.

4. A label having a dry, solid coating thereon for securing it to the object to be labelled, which coating is non-tacky at room temperatures and includes as ingredients an amorphous, potentially viscid, polymeric material and a latent plasticizer of crystalline form uniformly distributed throughout the mass of the coating, which plasticizer on heating coalesces with the rest of the composition, the plasticizer being present in significant proportion to provide for such label after heating an adhesive coating having a temperature of adhesiveness, subsequent adhesive temperature, at least 10° F. lower than the temperature of adhesiveness of the original coating before heating, initial adhesive temperature.

5. An article having a dry, solid, coating film adherent thereto by means of which it may, after heat activation of the coating, be adhesively secured to another article, the coating being non-tacky at room temperatures and including as ingredients an amorphous, potentially viscid, polymeric material and a latent crystalline plasticizer therefore intimately mixed therewith in substantially uniform proportions throughout the mass of the film, the said ingredients coexisting each in physically independent individuality, but being coalescent on heating, the plasticizer being present in significant proportion to provide after heating a film of coalesced mixture having a temperature of adhesiveness, subsequent adhesive temperature, at least 10° F. lower than the temperature of adhesiveness of the original coating before heating, initial adhesive temperature.

6. A thin, flexible sheet having adherent to the surface thereof a dry, solid, coating film by means of which it may, after heat activation of the coating, be adhesively secured to another article, the coating being non-tacky at room temperatures and including as ingredients an amorphous, potentially viscid, polymeric material and a latent crystalline plasticizer therefor intimately mixed therewith in substantially uniform proportions throughout the mass of the film, the said ingredients coexisting each in physically independent individuality, but being coalescent on heating, the plasticizer being present in significant proportion to provide after heating a film of coalesced mixture having a temperature of adhesiveness, subsequent adhesive temperature, at least 10° F. lower than the temperature of adhesiveness of the original coating before heating, initial adhesive temperature.

7. A coherent, solid and megascopically homogeneous, potentially adhesive composition suitable for production as a megascopically continuous, thin, film-like layer to provide an intimate adhesive joint between two parts, said composition being non-tacky at room temperatures but activatable to adhesive softness by heat, and comprising an amorphous, potentially viscid, polymeric material and a crystalline plasticizer therefor which is present in the form of discrete particles substantially uniformly distributed throughout the mass of the composition in mechanical admixture therewith but in physically independent form, the plasticizer being present in significant proportion to provide a merged mixture which after subsequent cooling will have and retain for a substantial period an adhesiveness permitting its application to use at room temperatures without renewed heating.

LLOYD M. PERRY.

REFERENCES CITED

The following references are of record in the file of this patent:

UNITED STATES PATENTS

| Number | Name | Date |
|---|---|---|
| 1,405,491 | Clarke | Feb. 7, 1922 |
| 1,744,582 | Scott | Jan. 21, 1930 |
| 2,047,968 | Jacobsen | July 21, 1936 |
| 2,277,259 | Schnabel et al. | Mar. 24, 1942 |
| 2,385,879 | Patton | Oct. 2, 1945 |